United States Patent
Swinkels et al.

(10) Patent No.: US 9,191,280 B2
(45) Date of Patent: Nov. 17, 2015

(54) SYSTEM, DEVICE, AND METHOD FOR AVOIDING BANDWIDTH FRAGMENTATION ON A COMMUNICATION LINK BY CLASSIFYING BANDWIDTH POOLS

(75) Inventors: Gerard L. Swinkels, Ottawa (CA); Darek Skalecki, Ottawa (CA)

(73) Assignee: Ciena Corporation, Hanover, MD (US)

(*) Notice: Subject to any disclaimer, the term of this patent is extended or adjusted under 35 U.S.C. 154(b) by 720 days.

(21) Appl. No.: 13/447,969

(22) Filed: Apr. 16, 2012

(65) Prior Publication Data
US 2013/0272318 A1  Oct. 17, 2013

(51) Int. Cl.
H04J 3/16 (2006.01)
H04L 12/24 (2006.01)
H04L 12/54 (2013.01)

(52) U.S. Cl.
CPC ............ *H04L 41/0896* (2013.01); *H04L 12/56* (2013.01)

(58) Field of Classification Search
CPC .................................................. H04L 12/5695
USPC ......................................... 370/468, 469, 470
See application file for complete search history.

(56) References Cited

U.S. PATENT DOCUMENTS

| | | | |
|---|---|---|---|
| 6,560,243 B1* | 5/2003 | Mogul ......................... | 370/468 |
| 7,369,558 B1* | 5/2008 | Dianda et al. .............. | 370/395.1 |
| RE41,986 E* | 12/2010 | Rexford et al. .............. | 370/389 |
| 8,806,287 B1* | 8/2014 | Jain et al. ..................... | 714/748 |
| 8,837,282 B2* | 9/2014 | Polk et al. .................... | 370/230 |
| 2005/0132068 A1* | 6/2005 | Rajamony ..................... | 709/228 |
| 2006/0095637 A1* | 5/2006 | Hirayama et al. ........... | 710/309 |
| 2010/0202305 A1* | 8/2010 | Wijting et al. ............... | 370/252 |
| 2012/0087377 A1* | 4/2012 | Lai ............................... | 370/427 |

* cited by examiner

*Primary Examiner* — Hassan Kizou
*Assistant Examiner* — Abdelnabi Musa
(74) *Attorney, Agent, or Firm* — Clements Bernard PLLC; Christopher L. Bernard; Lawrence A. Baratta, Jr.

(57) ABSTRACT

A method and system for routing a connection on a communication network. A first bandwidth pool is classified as a long lived bandwidth pool and a second bandwidth pool is classified as a short lived bandwidth pool. The long lived bandwidth pool is used to route connections having a duration that are expected to equal or exceed a predetermined time. The short lived bandwidth pool is used to route connections having a duration that are not expected to exceed the predetermined time. A request to route a connection on the communication network is received. At least one characteristic of the connection is determined and is used to determine whether to route the connection on the long lived bandwidth pool or short lived bandwidth pool.

20 Claims, 5 Drawing Sheets

SYSTEM, DEVICE, AND METHOD FOR AVOIDING BANDWIDTH FRAGMENTATION ON A COMMUNICATION LINK BY CLASSIFYING BANDWIDTH POOLS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to network communications, and in particular to a method and system for avoiding bandwidth fragmentation on a network link.

BACKGROUND OF THE INVENTION

The management of bandwidth in a network includes allocating available bandwidth efficiently by taking into consideration the different types of network traffic and quality of service requirements. Bandwidth allocation and deallocation may cause bandwidth fragmentation, which may result in link unavailability even when sufficient aggregate bandwidth is available. The continuous setup, deletion and re-routing of connections in a network may cause the network's performance to suffer due to bandwidth fragmentation. For example, a network may utilize only 40% of its available bandwidth to route connections, referred to herein as sub-network connections ("SNCs"), because the remaining 60% may be divided into bandwidth fragments that are too small to route an SNC.

Bandwidth fragmentation may affect routing significantly and may delay allocation of cost effective bandwidth. A sub-network connection ("SNC") setup request may be treated differently depending on the bandwidth requirements of the SNC. For example, bandwidth fragmentation may cause SNCs with a low bandwidth requirement to obtain bandwidth easily, while SNCs with high bandwidth requirements may have a more difficult time obtaining bandwidth.

Given continuous bandwidth fragmentation, in order to maintain a desired network performance level, network administrators schedule automatic bandwidth defragmentation operations. While some networks support automatic bandwidth defragmentation, some networks, such as Generalized Multi-protocol Label Switching (GMPLS) networks, require bandwidth defragmentation to be performed manually. As such, connections have to be manually torn down and moved to a different link. Many times, for networks such as Synchronous Optical Network (SONET) and Synchronous Digital Hierarchy (SDH) networks, a defragmentation operation may not be enough to improve the performance of the network and additional packing algorithms may need to be employed. Even though bandwidth defragmentation may improve a link's performance, network defragmentation disturbs traffic on the lines.

It is therefore desirable to have a method and system to avoid bandwidth fragmentation on a network link.

SUMMARY OF THE INVENTION

The present invention advantageously provides a method and system for routing a connection on a communication network. A first bandwidth pool is classified as a long lived bandwidth pool. The long lived bandwidth pool is used to route connections having a duration that is expected to at least one of equal and exceed a predetermined time. A second bandwidth pool is classified as a short lived bandwidth pool. The short lived bandwidth pool is used to route connections having a duration that is not expected to exceed the predetermined time.

In accordance with another aspect, the invention provides a device for routing a connection on a communication network. The device includes a processor. The processor establishes a first bandwidth pool as a long lived bandwidth pool. The long lived bandwidth pool being used to route connections having a duration that is expected to at least one of equal and exceed a predetermined time. The processor establishes a second bandwidth pool as a short lived bandwidth pool. The short lived bandwidth pool being used to route connections having a duration that is not expected to exceed the predetermined time.

In accordance with yet another aspect, the invention provides a system for routing a connection on a communication network. The system includes a first network element. The first network element has a processor that establishes a first bandwidth pool as a long lived bandwidth pool. The long lived bandwidth pool being used to route connections having a duration that is expected to at least one of equal and exceed a predetermined time. The processor establishes a second bandwidth pool as a short lived bandwidth pool. The short bandwidth pool being used to route connections having a duration that is not expected to exceed the predetermined time.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
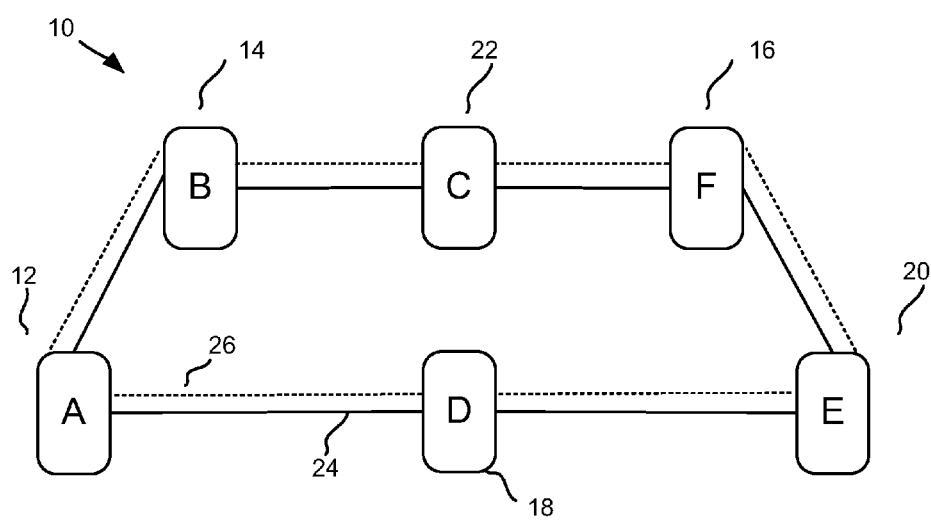
FIG. 1 is a block diagram of an exemplary network.

Referring now to the drawing figures, in which like reference designators denote like elements, there is shown in FIG. 1 a diagram of an exemplary network denoted generally as "10." Network 10 includes exemplary nodes 12, 14, 16, 18, 20 and 22. A solid line in the drawing indicates exemplary first bandwidth pool 24 for routing a connection, i.e., an SNC, between the source node 12 and the destination node 20 via intermediate node 18 or via intermediate nodes 14, 22 and 16. A dashed line in the drawing indicates exemplary second bandwidth pool 26 for routing an SNC through the network from node 12 to 20 via nodes 14, 22 and 16 or via node 18. SNCs are aggregated in bandwidth pools, such as first bandwidth pool 24 and second bandwidth pool 26. Although FIG. 1 shows exemplary nodes 12-22, exemplary first bandwidth pool 24 and exemplary second bandwidth pool 26, the invention is not limited to such. The invention may be applied to a variety of network sizes and configurations.

As used herein, bandwidth refers to an amount of data that may be transferred in a given time period on a link. In one embodiment, a network link may include multiple lines, e.g., physical connections, for transferring data. Measurement of the bandwidth on a network may include measuring a rate of transfer through a network link. One or more network links may form a bandwidth pool. Bandwidth pools may be classified as long lived bandwidth pools or short lived bandwidth pools. Bandwidth pools on a network may be classified according to whether the corresponding link(s) in the bandwidth pool are used for long term or short term connections.

In an exemplary embodiment, a connection may be routed on a communication network that has at least one long lived bandwidth pool, such as first bandwidth pool 24, and at least one short lived bandwidth pool, such as second bandwidth pool 26. The at least one long lived bandwidth pool may be used to route connections having a duration that is expected to at least one of equal and exceed a predetermined time. The at least one short lived bandwidth pool may be used to route connections having a duration that is not expected to exceed the predetermined time. A request to route the connection on the communication network is received, and at least one characteristic of the connection is determined. The characteristic is used to determine whether to route the connection on one of the long lived bandwidth pool and short lived bandwidth pool. The connection is routed on one of the long lived bandwidth pool and the short lived bandwidth pool based on the determination.

In another exemplary embodiment, network 10 may be an Automatically Switched Optical Network ("ASON") that may handle bandwidth resources, dynamically setup SNCs and reroute existing SNCs considering different levels of quality of service. The ASON may include three planes: a transport plane, a control plane and a management plane. The transport plane may contain switches for transporting user data. The control plane may manage the resources of network 10 and the connections coming in and out of network 10. Optical network controllers may discover a network topology, setup SNCs, restore SNCs, and may route SNCs, among other functions. The management plane may manage the control plane and may perform configuration management of the control plane or transport plane resources.

ASON 10 may experience a constant flow of SNCs, i.e., network calls, which may enter and leave network 10 continuously. A call may be a network-wide connection that supports a service. Calls may be associated with a call attribute, i.e. a connection characteristic, such as a setup priority and a holding priority. A setup priority may be a priority with which the SNC establishes itself relative to another SNC. A setup priority may be used to bump and tear down SNCs with low holding priorities in order to make room for another SNC. An exemplary setup priority may range from 0 to 7 and may be represented using three bits. A setup priority of "0" may indicate that the SNC has the highest setup priority, while a setup priority of "7" may indicate the lowest setup priority. An SNC setup may take into consideration quality of service constraints, end-to-end delay, delay jitter, bandwidth priority, etc.

An exemplary holding priority may range from 0 to 7 and may be represented using three bits. A holding priority may be a priority that determines whether an active SNC may be removed or bumped. As such, the setup and holding priority work together to determine bandwidth allocation. By way of example, when setting up an SNC on a link, a determination may be made that bandwidth availability is low. A holding priority of a new SNC may be compared to a setup priority of an SNC that is using bandwidth on the link. Although an exemplary setup priority and holding priority ranging from 0 to 7 are described, the invention is not limited to such. The invention may be used with any range of setup and holding priorities.

Another SNC attribute is an incarnation number. The incarnation number may indicate how many times an SNC has been instantiated in network 10. The incarnation number may increase every time an SNC gets moved to use a different link's bandwidth. Another SNC attribute may be a call start time. A call start time may include a time a call was first put into service. For example, a call start time may have an incarnation of 1 when the SNC is first put into service. Another SNC attribute or characteristic may be a call age. A call age may be the difference between a current time and a call start time. An expected call duration characteristic may indicate the amount of time a call is expected to last.

Lines connecting control plane enabled network elements may be bundled together in order to form a link, i.e., one or more lines may form a link. Services may be added, dropped or switched through network 10 at a network element ("NE"), i.e., at a node in network 10, such as one of nodes 12-22. An SNC may be routed across a link with multiple lines. Furthermore, a bandwidth pool, such as first bandwidth pool 24 and second bandwidth pool 26, may advertise both a maximum aggregate free bandwidth and a maximum number of SNCs that a link may support.

The continuous setup of new SNCs and continuous deletion of expired SNCs may cause link fragmentation. In like manner, link fragmentation on a hop-by-hop basis may occur as a result of SNC churn, call redials, call additions and call deletions. For example, if a link bandwidth is reaching "0" bandwidth availability, comingling of high holding priority SNCs and low holding priority SNCs may occur, which may be undesirable. A maximum contiguous SNC bandwidth may become smaller over time as SNCs are added and removed from a link. An SNC may be removed from network 10 via, for example, SNC bumping. SNCs with lower holding priority SNCs may be removed from a link, which may create a maximum amount of free bandwidth on the link. A maximum amount of free bandwidth on a link may allow larger SNCs to be routed.

Figure 2:
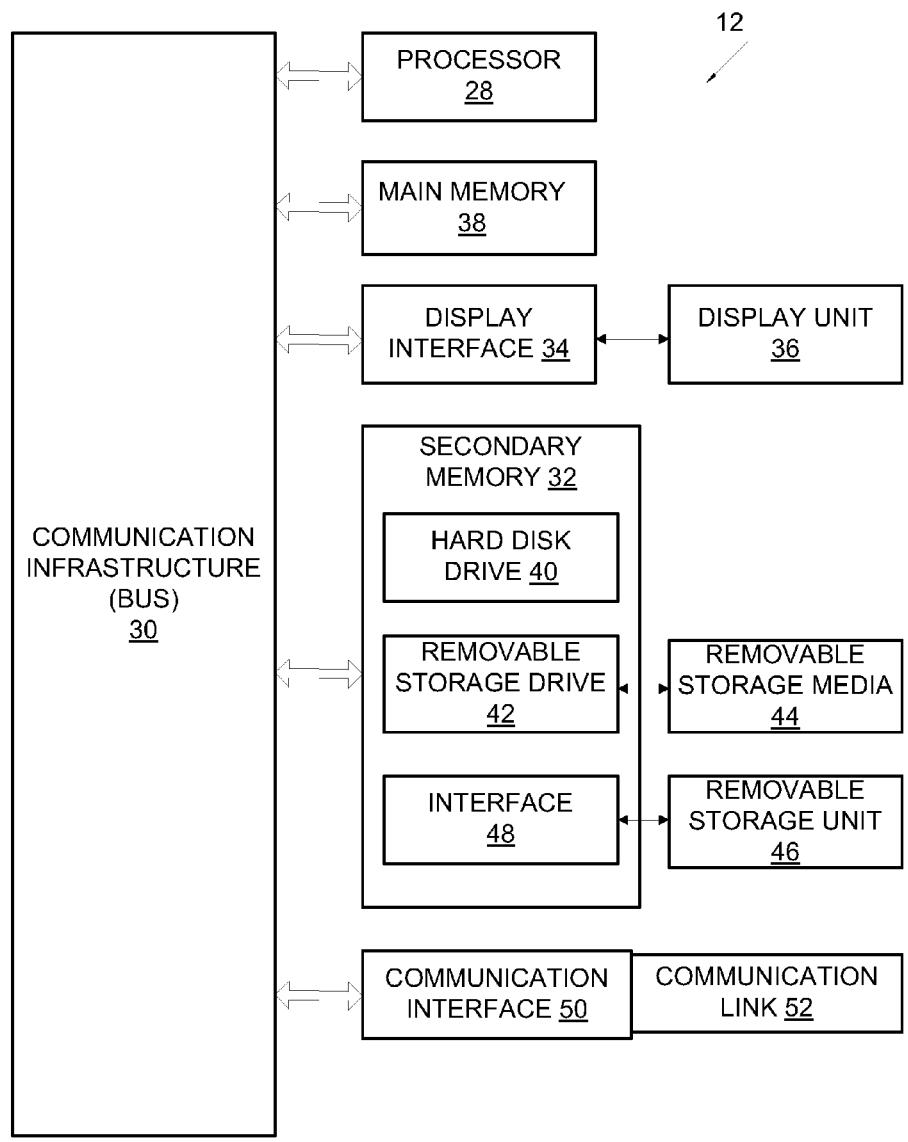
FIG. 2 is a block diagram of an exemplary network node.

FIG. 2 is a block diagram of an exemplary node 12. Node 12 may be a network node that includes one or more processors, such as processor 28 programmed to perform the functions described herein. Processor 28 is operatively coupled to a communication infrastructure 30, e.g., a communications bus, cross-bar interconnect, network, etc. Processor 28 may exercise control over nodes in network 10, such as nodes 12-22, to tear down and establish SNCs.

Processor 28 may classify a first bandwidth pool as a long lived bandwidth pool. The long lived bandwidth pool may be used to route connections having a duration that is expected to at least one of equal and exceed a predetermined time. Processor 28 may further classify a second bandwidth pool as a short lived bandwidth pool. The short lived bandwidth pool is used to route connections having a duration that is not expected to exceed the predetermined time. In another embodiment, processor 28 may determine a characteristic of a connection on a bandwidth pool and based on the characteristic, processor 28 may classify the bandwidth pool as a long lived bandwidth pool or a short lived bandwidth pool. For example, if the bandwidth pool is routing connections on their home paths, the bandwidth pool may be classified as a long term bandwidth pool. If the bandwidth pool is routing connections that are temporary, the bandwidth pool may be classified as a short lived bandwidth pool.

Although this exemplary embodiment describes network node 12 classifying a first bandwidth pool as a long lived bandwidth pool and a second bandwidth pool as a short lived bandwidth pool, and controlling the routing of SNCs on first bandwidth pool 24 or second bandwidth pool 26 based on one or more characteristics of the SNC, the invention is not limited to such. It is contemplated that one or more network nodes 14-22 may classify a first bandwidth pool as a long lived bandwidth pool and a second bandwidth pool as a short lived bandwidth pool; and/or (2) determine whether to route an SNC on a long lived bandwidth pool, such as first bandwidth pool 24, or a short lived bandwidth pool, such as second bandwidth pool 26, based on at least one characteristic of the SNC.

The invention may also be implemented in a distributed arrangement, where each node on a path of an SNC may determine a characteristic of the SNC and route the SNC on either first bandwidth pool 24 or second bandwidth pool 26 based on the determined characteristic. As such, the invention is not limited to one node classifying bandwidth pools and controlling the routing of SNCs on network 10. Additionally, in another exemplary embodiment, a separate controller may perform the functions described herein for classifying bandwidth pools and routing SNCs. By way of example, the separate controller may classify bandwidth pools, control nodes 12-22 and determine the routing of SNCs on network 10. The separate controller may determine the characteristics of an SNC and route the SNC on either first bandwidth pool 24 or second bandwidth pool 26. Additionally, implementation may be made in other distributed arrangement, e.g., where one node or a separate controller classifies bandwidth pools and another node or separate controller determines a characteristic of an SNC and routes the SNC on either first bandwidth pool 24 or second bandwidth pool 26 depending on the characteristic.

Processor 28 may execute computer programs stored on disk storage for execution via secondary memory 32. Various software embodiments are described in terms of this exemplary node 12. It is understood that computer systems and/or computer architectures other than those specifically described herein can be used to implement the invention. It is also understood that the capacities and quantities of the components of the architecture described below may vary depending on the device, the quantity of devices to be supported, as well as the intended interaction with the device. For example, configuration and management of node 12 may be designed to occur remotely by web browser. In such case, the inclusion of a display interface and display unit may not be required.

Node 12 may optionally include or share a display interface 34 that forwards graphics, text, and other data from the communication infrastructure 30 (or from a frame buffer not shown) for display on the display unit 36. Display 36 may be a cathode ray tube (CRT) display, liquid crystal display (LCD), light-emitting diode (LED) display, and touch screen display, among other types of displays. Node 12 also includes a main memory 38, such as random access memory ("RAM") and read only memory ("ROM"), and may also include secondary memory 32. Main memory 38 may store topology information related to network 10 and routing rules for routing connections on network 10. Topology information may include topology information relating to a path through network 10 from a source node, such as node 12, to a destination node, such as node 20. The topology information may also include home path information for each link, and connections associated with each node in the network.

Secondary memory 32 may include, for example, a hard disk drive 40 and/or a removable storage drive 42, representing a removable hard disk drive, magnetic tape drive, an optical disk drive, a memory stick, etc. The removable storage drive 42 reads from and/or writes to a removable storage media 44 in a manner well known to those having ordinary skill in the art. Removable storage media 44, represents, for example, a floppy disk, external hard disk, magnetic tape, optical disk, etc. which is read by and written to by removable storage drive 42. As will be appreciated, the removable storage media 44 includes a computer usable storage medium having stored therein computer software and/or data.

In alternative embodiments, secondary memory 32 may include other similar devices for allowing computer programs or other instructions to be loaded into the computer system and for storing data. Such devices may include, for example, a removable storage unit 46 and an interface 48. Examples of such may include a program cartridge and cartridge interface (such as that found in video game devices), flash memory, a removable memory chip (such as an EPROM, EEPROM or PROM) and associated socket, and other removable storage units 46 and interfaces 48 which allow software and data to be transferred from the removable storage unit 46 to other devices.

Node 12 may also include a communications interface 50. Communications interface 50 allows software and data to be transferred to external devices. Examples of communications interface 50 may include a modem, a network interface (such as an Ethernet card), a communications port, a PCMCIA slot and card, wireless transceiver/antenna, etc. Software and data transferred via communications interface/module 50 may be, for example, electronic, electromagnetic, optical, or other signals capable of being received by communications interface 50. These signals are provided to communications interface 50 via the communications link (i.e., channel) 52. Channel 52 carries signals and may be implemented using wire or cable, fiber optics, a phone line, a cellular phone link, an RF link, and/or other communications channels.

It is understood that node 12 may have more than one set of communication interfaces 50 and communication links 52. For example, node 12 may have a communication interface 50/communication link 52 pair to establish a communication zone for wireless communication, a second communication interface 50/communication link 52 pair for low speed, e.g., WLAN, wireless communication, another communication interface 50/communication link 52 pair for communication with low speed wireless networks, and still another communication interface 50/communication link 52 pair for communication in an optical network. Communication interface 50 may include transmitter and receiver circuitry for communicating with communication link 52.

Computer programs (also called computer control logic) are stored in main memory 38 and/or secondary memory 32. For example, computer programs are stored on disk storage, i.e. secondary memory 32, for execution by processor 28 via RAM, i.e. main memory 38. Computer programs may also be received via communications interface 50. Such computer programs, when executed, enable the method and system to perform the features of the present invention as discussed herein. In particular, the computer programs, when executed, enable processor 28 to perform the features of the corresponding method and system. Accordingly, such computer programs represent controllers of the corresponding device.

Processor 28 operates under the direction of software instructions to perform the various functions described herein for categorizing bandwidth pools on network 10 as long-lived bandwidth pools or short-lived bandwidth pools, and for routing a connection based on an attribute, i.e., a characteristic, of the connection. A characteristic of the connection may include, but not be limited to, a connection priority, an expected duration of the connection, a home path associated with the connection and a least-cost path associated with the connection.

Processor 28 may start an operation to restore a maximum SNC bandwidth available on a link. The operation may include performing bandwidth defragmentation to coalesce bandwidth onto a fewest number of links. Alternatively, processor 28 may prevent bandwidth fragmentation by dividing bandwidth pools into two or more schemes. For example, bandwidth pools may be divided into long-lived bandwidth pools and short-lived bandwidth pools. In an exemplary embodiment, first bandwidth pool 24 may be categorized as a long-lived bandwidth pool and second bandwidth pool 26 may be categorized as short-lived bandwidth pool. The categorization and configuration of bandwidth pools may be done manually by an operator or may be done automatically, for example, based on the characteristics of the SNCs on the bandwidth pools at a point in time or based on analysis of the characteristics of the SNCs over the course of time.

Similarly, bandwidth pools may be granularized according to how bandwidth pools are used, i.e., according to a particular service the bandwidth pool is being used for. By way of example, short-lived SNCs may include SNCs that are transient. Long-lived SNCs may include SNCs that are non-transient and nearly permanent. SNC's attributes, such as a setup priority and a holding priority, may be used to determine which SNCs may be put on long-lived bandwidth pools and short-lived bandwidth pools.

Separating short-lived SNCs from long-lived SNCs may avoid the need to apply defragmentation algorithms to, for example, all SNCs on all links, as all calls on a link may not need to be broken. A control plane or a network planning tool, such as node 12, may aggregate SNCs with low holding priorities (i.e., with a high likelihood of being bumped or removed from the network), new SNCs, and SNCs of short duration on a same link to reduce link fragmentation in other links. SNCs with low holding priorities may include SNCs dedicated to best-effort service, i.e., SNCs without quality of service requirements. Processor 28 may route a connection based on an attribute/characteristic of the connection.

Processor 28 may route a connection on a communication network having at least one long lived bandwidth pool and at least one short lived bandwidth pool. The at least one long lived bandwidth pool may be used to route connections having a duration that is expected to at least one of equal and exceed a predetermined time. The predetermined time may be influenced by a mean-time-to-repair ("MTTR") value, a time of day reversion behavior, such as once an hour or once a day, and a wait-to-restore time ("WTR") for revertive SNCs, i.e., SNCs that will revert back to the home path one the failure has been resolved. An MTTR may represent an average time required to repair a connection or a node. The MTTR may measure the elapsed time between the point at which a failure is first discovered until the point at which the connection returns to operation. The WTR time may be defined as a period of time that must elapse after a recovered fault before the connection can be used again to transport traffic. The WTR time may prevent frequent operation of a protection switch due to an intermittent defect. The WTR timer may be configured manually.

The at least one short lived bandwidth pool may be used to route connections having a duration that is not expected to exceed the predetermined time. A request to route the connection on the communication network may be received. At least one characteristic of the connection may be determined by processor 28. The characteristic is used to determine whether to route the connection on one of the long lived bandwidth pool and short lived bandwidth pool. The connection is routed on one of the long lived bandwidth pool and the short lived bandwidth pool based on the determination.

In an exemplary embodiment, a characteristic of the connection may be a call age of the connection, i.e., a connection's active time. Processor 28 may group together SNCs according to their call age. For example, the oldest SNCs may be grouped together on one bandwidth pool, and the youngest SNCs may be group together on another bandwidth pool. An SNC setup message may be augmented to indicate a relative duration of an SNC. Processor 28 may route SNCs that have been active for a long time, i.e., when the call age of the connection exceeds a time threshold, on a long-term bandwidth pool, such as first bandwidth pool 24. Alternatively, processor 28 may route the connection on second bandwidth pool 26 when the call age does not exceed a time threshold. In this way, SNCs with a short active time or a short proposed active time may be placed on a bandwidth pool subject to high churn, such as second bandwidth pool 26. This may cause SNCs with long active times or long proposed active times to be mainly aggregated on long-lived bandwidth pools, such as first bandwidth pool 24. As short term SNCs disappear from long-lived bandwidth pools such as first bandwidth pool 24, bandwidth may naturally coalesce. There may be no need to manually coalesce long term bandwidth. SNCs may have been already grouped together based on whether the call ages of the SNCs exceed a time threshold.

A short-term SNC may have been setup with a short proposed active time. However, when the call age of the SNC is examined, the call age may indicate that the connection has been active for longer than the initial proposed active time. The SNC may be reclassified as a long term SNC and may be moved to a long-term bandwidth pool, such as first bandwidth pool 24. By way of example, a short-term SNC that has been active for two days may be reclassified as a long-term SNC when the call age of the SNC exceeds a time threshold, for example, two days.

In another exemplary embodiment, a characteristic of the connection may be an expected duration of the connection, i.e. a proposed active time. An expected duration of the connection may be a long term duration, i.e., the expected duration of the connection is at least one of equal and exceed the predetermined time, or a short term duration, i.e., the expected duration of the connection does not exceed the predetermined time. Processor 28 may route the connection on first bandwidth pool 24 when the expected duration of the connection is at least one of equal and exceed the predetermined time. Alternatively, processor 28 may route the connection on second bandwidth pool 26 when the expected duration of the connection does not exceed the predetermined time.

In another exemplary embodiment, an attribute or characteristic of the connection may be a connection priority. A connection priority may be one of a high holding priority or a low holding priority. Processor 28 may route the connection on first bandwidth pool 24 when the connection priority is a high holding priority. Alternatively, processor 28 may route the connection on second bandwidth pool 26 when the connection priority is a low holding priority. A holding priority of other SNCs on the line may be examined to determine whether an SNC may be routed on the line. To free bandwidth on the line, i.e. on the bandwidth pool, SNCs with a high holding priority may be setup on first bandwidth pool 24 and SNCs with a low holding priority may be setup on second bandwidth pool 26.

By way of example, an SNC with a setup priority of '7' and a holding priority of '0' may be categorized as an SNC having the lowest setup priority for establishing itself on a bandwidth pool. However, once the SNC is established, no other SNC may bump it, as the SNC has a holding priority of '0.' Since the SNC is unlikely to be bumped or deleted, the SNC may be routed on first bandwidth pool 24. Routing the SNC on a long-lived bandwidth pool may prevent bandwidth pool/link bandwidth fragmentation.

Processor 28 or a planning tool may examine all or less than all SNCs across a network. When SNC regroom is performed, SNCs that are unlikely to be deleted or bumped from a network may be placed on a minimum number of bandwidth pools, such as first bandwidth pool 24. Bandwidth pools containing SNCs with high holding priority or long hold time, such as first bandwidth pool 24, may not release bandwidth, which may prevent first bandwidth pool 24 from experiencing bandwidth fragmentation.

In another exemplary embodiment, a characteristic of the connection may be a home path associated with the connection. The original route of an SNC is referred to as its home path. An exemplary SNC's home path may go from node 12 to node 20, via intermediate node 18. If an SNC is on its home path, processor 28 may route the SNC on a long-lived bandwidth pool. During reversion, a determination may be made as to whether an SNC will revert back to its home path. This may be a binary determination or may include performing additional functions, such as hold-off time determinations. Since most SNCs on their home path have long holding times, these SNCs may be put on long-lived bandwidth pools, such as first bandwidth pool 24. To determine whether an SNC is on its home path, an incarnation number may be examined. If an incarnation number is 1, then the current SNC route may be the home route. Additionally, if a home route is signaled in a signaled setup message, the home route may be used to route the SNC. However, if the connection is not on its home path, the connection may be routed on a short-lived bandwidth pool, such as second bandwidth pool 26.

In another exemplary embodiment, a characteristic of the connection may be a connection type. The connection type may be, for example, a permanent virtual circuit (PVC) connection or a switched permanent virtual circuit connection. A PVC may be a fixed circuit that is defined in advance by a network manager. A PVC appears like a pathway that is dedicated and may behave like a physically connected circuit. The permanence of the line removes the setup overhead and may improve performance. A PVC SNC may be a traditional unprotected SNC that does not perform a function when failure occurs.

A PVC may be normally implemented by a network management system, but it may also be implemented by a control plane. PVCs may be aggregated on long-lived bandwidth pools, such as first bandwidth pool 24, since bandwidth used by PVCs may not be removed from the network. Additionally, PVCs may have a long holding time and may have an incarnation number of 1. Routing PVCs on first bandwidth pool 24 may prevent the PVCs from being disturbed.

In another exemplary embodiment, a Switched Permanent Virtual Circuit ("SPVC") may be routed between nodes 12 and 20, via intermediate node 18. A SPVC may be a control plane SNC that performs a function when a network failure occurs. Exemplary functions may include releasing bandwidth, redirecting a connection and re-routing a connection after a network failure. An SPVC establishes a temporary virtual circuit, with sessions that may last only as long as needed. Once a communication session is complete, the virtual circuit may be terminated. Accordingly, when the connection is a switched permanent virtual circuit connection, processor 28 may route the connection on second bandwidth pool 26.

Likewise, SPVCs not on their home route may have a high probability of being reverted back to their home path. Accordingly, to confine defragmentation to the short-lived pool of lines, SPVCs may be put on short-lived bandwidth pools, such as second bandwidth pool 26, along with other short-lived SPVCs. A determination may be made as to whether routing the connection on the long lived bandwidth pool or the short lived bandwidth pool will cause defragmentation of that corresponding pool. If it is determined that the connection will cause defragmentation, the connection may be routed on the short lived bandwidth pool in order to confine defragmentation to the short-lived bandwidth pool, given that disturbing long-lived SNCs is undesirable. To determine whether an SPVC is on its home path, a home route attribute in a signaled setup message may be examined. Additionally, if an SPVC has a low holding priority, the SPVC may be bumped by other SNCs with high setup priority. Low holding priority SPVCs may also be put on short-lived bandwidth pools, such as second bandwidth pool 26. In order to determine whether an SPVC has a low holding priority, a holding priority attribute in a signaled setup message may be examined. Even though two connection types, PVC and SPVC, are described, the invention is not limited to such. The invention may be used with other connection types. Other attributes of the SPVC may be examined in order to determine whether to route the SPVC in a short-lived bandwidth pool or a long-lived bandwidth pool.

In another exemplary embodiment, processor 28 may determine whether the connection is on a least-cost path, i.e., a best path. A best path for an SNC may be a least cost route, i.e., a route where the hops, weight, etc. is the lowest. An SNC that currently is not on its least-cost path may be moved to its best path at a future time. To determine whether an SNC is on its best path, a reduced setup priority attribute in a signaled setup message may be examined. Additionally, signaling may indicate that an SNC is not on its best path. SNCs signaled with reduced setup priorities may also be put in a short-lived bandwidth pool. Processor 28 may route the connection on second bandwidth pool 26 when the connection is not on the least-cost path. If the connection is on the least-cost path, the connection may be routed on first bandwidth pool 24. Nonetheless, even though an SNC may not be on its best path, the SNC may not be moved when its current path is within n % of a desired service threshold. The service threshold may include a number of miles, latency, cost to implement, etc. It may be undesirable to move an SNC to a long-lived bandwidth pool if a benefit gained by moving the SNC is small.

Figure 3:
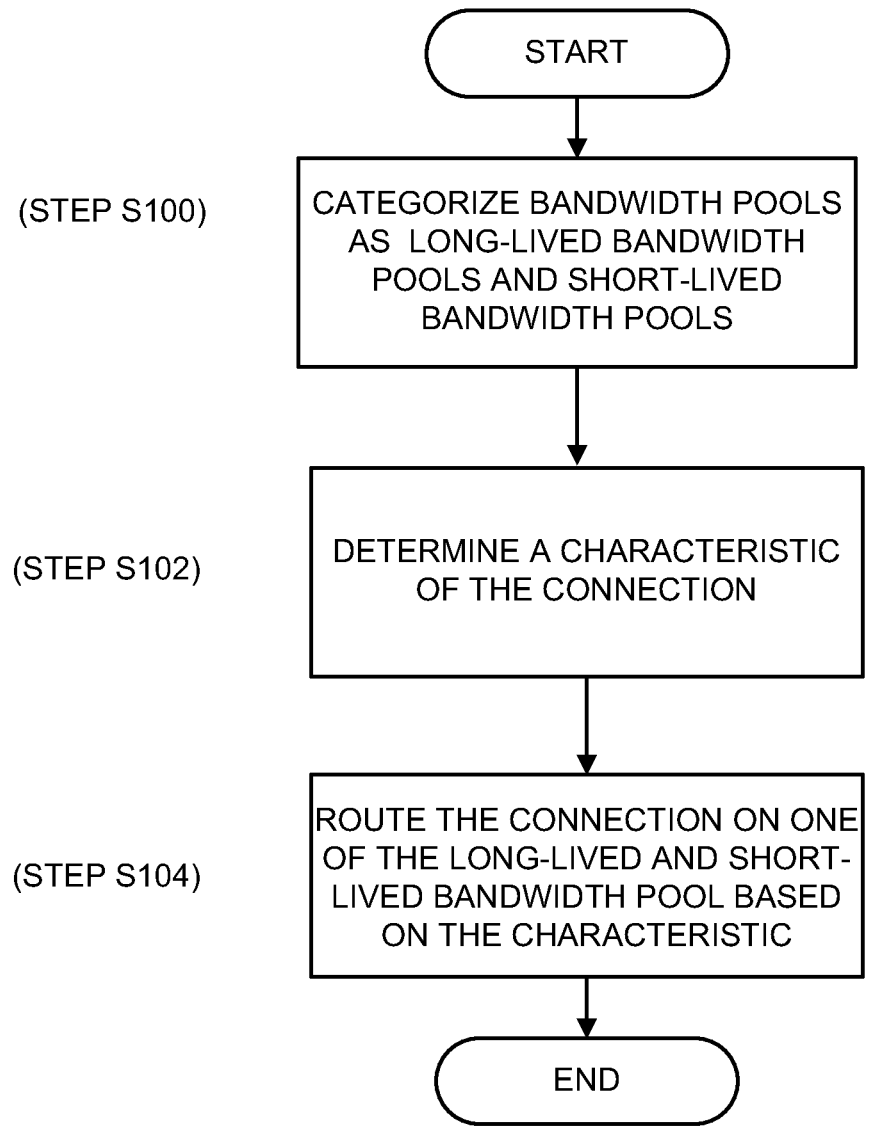
FIG. 3 is a flow chart of an exemplary process for routing a connection.

FIG. 3 is a flow chart of an exemplary process for routing a connection. Bandwidth pools are classified/categorized as long-lived bandwidth pools and short-lived bandwidth pools (Step S100). A characteristic of the connection may be determined (Step S102). As discussed above, the characteristic may include a connection priority, a home path associated with the connection, an expected duration of the connection, a connection type, a call age of the connection, the least-cost path associated with the connection, among other characteristics. The connection is routed on a long-lived bandwidth pool or a short-lived bandwidth pool based on the characteristic of the connection (Step S104). For example, if the connection has a high holding priority, the connection is routed from origin to a destination on the long-lived bandwidth pool.

Figure 4A:
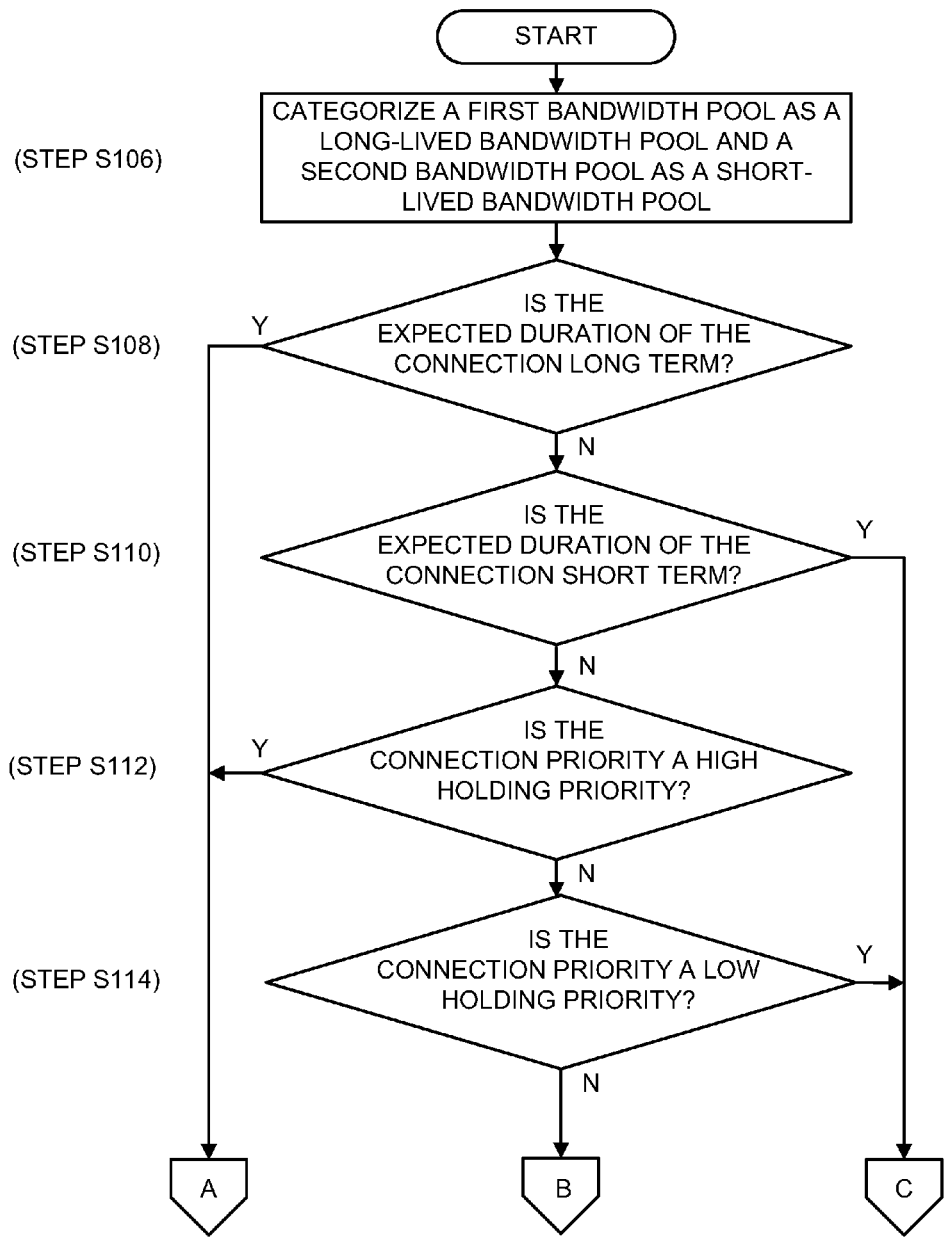
FIGS. 4A and 4B are a flow chart of an exemplary process for routing a connection.
Figure 4B:
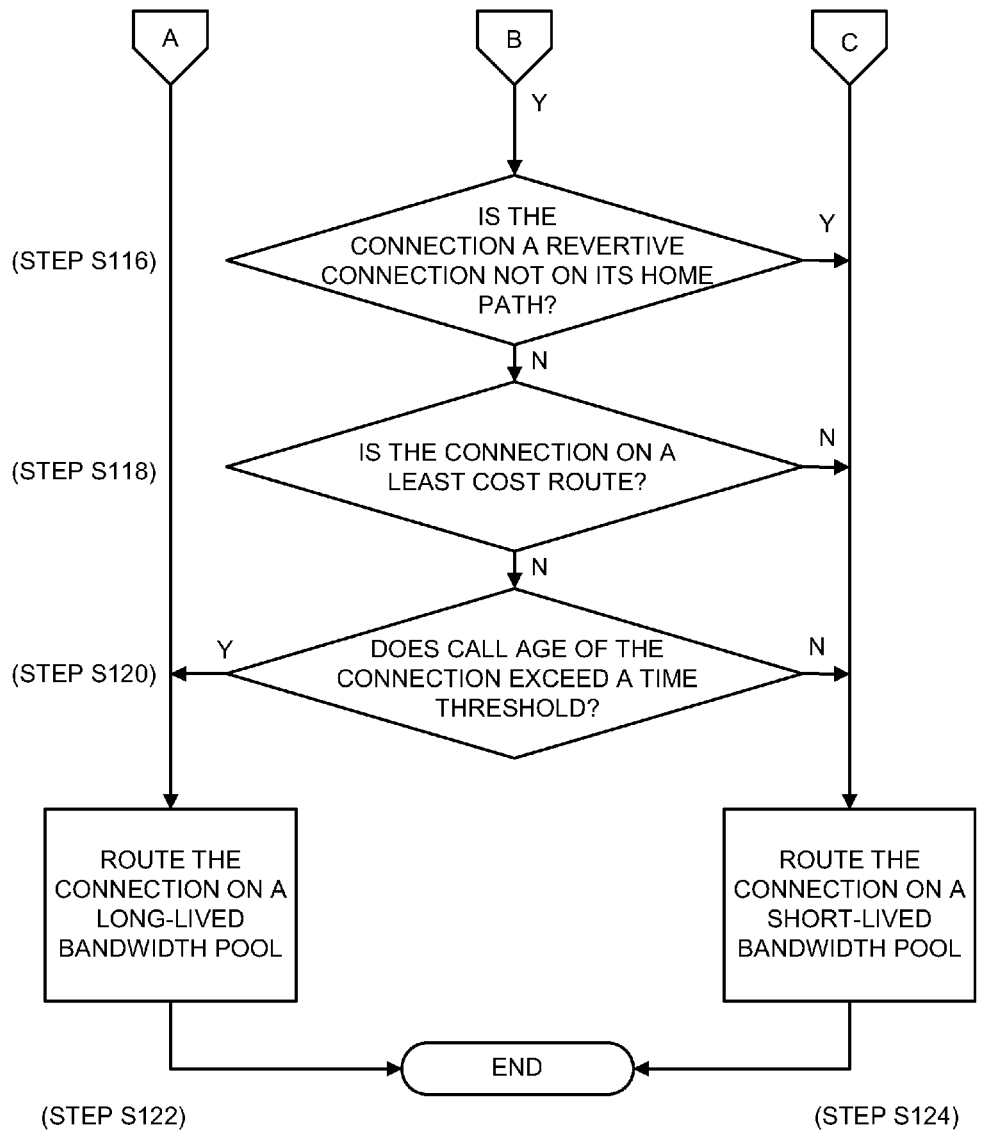

FIGS. 4A and 4B are a flow chart of an exemplary process for routing a connection based on additional attributes. First bandwidth pool 24 may be categorized as a long-lived bandwidth pool and second bandwidth pool 26 may be categorized as a short-lived bandwidth pool (Step S106). A determination may be made as to whether the expected duration of connection is long term (Step S108). If the expected duration of the connection is long term, the connection may be routed on the long-lived bandwidth pool (Step S122). Else, a determination may be made as to whether the expected duration of the connection is short term (Step S110). If the expected duration of the connection is short term, the connection may be routed on the short-lived bandwidth pool (Step S124). A determination may be made as to whether the connection priority is a high holding priority (Step S112). If the connection priority is a high holding priority, the connection may be routed on the long-lived bandwidth pool (Step S122). Else, a determination is made as to whether the connection priority is a low holding priority (Step S114). If the connection priority is a low holding priority, the connection may be routed on the short-lived bandwidth pool (Step S124).

A determination may be made as to whether the connection is a revertive connection not on its home path (Step S116). If the connection is a revertive connection not on its home path, the connection may be routed on the short-lived bandwidth pool (Step S122). Else, a determination may be made as to whether the connection is a on a least cost route (Step S118). If the connection is not on a least cost route, the connection may be routed on the short-lived bandwidth pool (Step S124). Else, a determination may be made as to whether the call age of the connection exceeds a time threshold (Step S120). If the call age exceeds a time threshold, the connection may be routed on the long-lived bandwidth pool (Step S122). Else, if the call age does not exceed a time threshold, the connection may be routed on the short-lived bandwidth pool (Step S124). Although Steps S106 through S120 are shown in FIGS. 4A and 4B in a particular order, the invention is not limited to such. Not all of Steps S106-S120 need to be considered, and particular embodiments may omit one or more steps. Further, the steps do not need to be executed in the order shown.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for routing a connection on a communication network, the method comprising:
   receiving a request to route the connection on the communication network;
   classifying, by a processor, a first bandwidth pool that is free as a long lived bandwidth pool, the long lived bandwidth pool being used to route connections having a duration that is expected to at least one of equal and exceed a predetermined time;
   classifying, by the processor, a second bandwidth pool that is free as a short lived bandwidth pool, the short lived bandwidth pool being used to route connections having a duration that is not expected to exceed the predetermined time;
   determining at least one characteristic of the connection, the characteristic being used to determine whether to route the connection on one of the long lived bandwidth pool and short lived bandwidth pool; and
   advertising, via a control plane to nodes in the communication network, available bandwidth in each of the long lived bandwidth pool and the short lived bandwidth pool.

2. The method of claim 1, further comprising:
   routing the connection on one of the long lived bandwidth pool and the short lived bandwidth pool based on the determination.

3. The method of claim 2, wherein the at least one characteristic is an expected duration of the connection, and routing the connection includes:
   routing the connection on the long lived bandwidth pool when the expected duration of the connection is at least one of equal and exceed the predetermined time; and
   routing the connection on the short lived bandwidth pool when the expected duration of the connection does not exceed the predetermined time.

4. The method of claim 2, wherein the at least one characteristic is a connection priority, and routing the connection includes:
   routing the connection on the long lived bandwidth pool when the connection priority is a high holding priority; and
   routing the connection on the short lived bandwidth pool when the connection priority is a low holding priority.

5. The method of claim 2, wherein the at least one characteristic is a home path associated with the connection, and routing the connection includes:
   routing the connection on the long lived bandwidth pool when the connection is on the home path associated with the connection; and
   routing the connection on the short lived bandwidth pool when the connection is not on the home path associated with the connection.

6. The method of claim 2, wherein the at least one characteristic is a call age of the connection, and routing the connection includes:
   routing the connection on the long lived bandwidth pool when the call age exceeds a time threshold; and routing the connection on the short lived bandwidth pool when the call age does not exceed the time threshold.

7. The method of claim 6, wherein the time threshold is based in part on at least one of a mean time to repair, a time of day reversion behavior, and a wait to restore time.

8. The method of claim 2, further comprising:
   determining whether the connection is on a least-cost path; and routing the connection includes:

routing the connection on the long lived bandwidth pool when the connection is on the least-cost path; and routing the connection on the short lived bandwidth pool when the connection is not on the least-cost path.

9. A device for routing a connection on a communication network, the device comprising:
   a receiver, the receiver receiving a request to route the connection on the communication network; and
   a processor, the processor configured to
      establish a first bandwidth pool that is free as a long lived bandwidth pool, the long lived bandwidth pool being used to route connections having a duration that is expected to at least one of equal and exceed a predetermined time;
      establish a second bandwidth pool that is free as a short lived bandwidth pool, the short lived bandwidth pool being used to route connections having a duration that is not expected to exceed the predetermined time;
      determine at least one characteristic of the connection, the characteristic being used to determine whether to route the connection on one of the long lived bandwidth pool and short lived bandwidth pool; and
      advertise, via a control plane to nodes in the communication network, available bandwidth in each of the long lived bandwidth pool and the short lived bandwidth pool.

10. The device of claim 9, wherein the processor is further configured to:
    route the connection on one of the long lived bandwidth pool and the short lived bandwidth pool based on the determination.

11. The device of claim 10, wherein the at least one characteristic is an expected duration of the connection, and the processor is further configured to:
    route the connection on the long lived bandwidth pool when the expected duration of the connection is at least one of equal and exceed the predetermined time; and
    route the connection on the short lived bandwidth pool when the expected duration of the connection does not exceed the predetermined time.

12. The device of claim 10, wherein the at least one characteristic is a connection priority, and the processor is further configured to:
    route the connection on the long lived bandwidth pool when the connection priority is a high holding priority; and
    route the connection on the short lived bandwidth pool when the connection priority is a low holding priority.

13. The device of claim 10, wherein the at least one characteristic is a home path associated with the connection, and the processor is further configured to:
    route the connection on the long lived bandwidth pool when the connection is on the home path associated with the connection; and
    route the connection on the short lived bandwidth pool when the connection is not on the home path associated with the connection.

14. The device of claim 10, wherein the at least one characteristic is a call age of the connection, and the processor is further configured to:
    route the connection on the long lived bandwidth pool when the call age exceeds a time threshold; and
    route the connection on the short lived bandwidth pool when the call age does not exceed the time threshold.

15. The device of claim 14, wherein the time threshold is based in part on at least one of a mean time to repair, a time of day reversion behavior, or a wait to restore time.

16. The device of claim 10, the processor further configured to:
    determine whether the connection is on a least-cost path;
    route the connection on the long lived bandwidth pool when the connection is on the least-cost path; and
    route the connection on the short lived bandwidth pool when the connection is not on the least-cost path.

17. A system for routing a connection on a communication network, the system comprising:
    a first network element, the first network element including
       a first processor, the first processor configured to
          establish a first bandwidth pool that is free as a long lived bandwidth pool, the long lived bandwidth pool being used to route connections having a duration that is expected to at least one of equal and exceed a predetermined time;
          establish a second bandwidth pool that is free as a short lived bandwidth pool, the short lived bandwidth pool being used to route connections having a duration that is not expected to exceed the predetermined time; and
          advertise, via a control plane to other network elements in the communication network, available bandwidth in each of the long lived bandwidth pool and the short lived bandwidth pool;
    a second network element, the second network element in communication with the first network element via the long lived bandwidth pool and the short lived bandwidth pool, the second network element comprising:
       a receiver, the receiver receiving a request to route the connection on the communication network; and
       a second processor, the second processor determining at least one characteristic of the connection, the characteristic being used to determine whether to route the connection on one of the long lived bandwidth pool and short lived bandwidth pool.

18. The system of claim 17, further comprising wherein the second processor is further configured to:
    route the connection on one of the long lived bandwidth pool and the short lived bandwidth pool based on the determination.

19. The system of claim 18, wherein the at least one characteristic is an expected duration of the connection, and routing the connection includes:
    routing the connection on the long lived bandwidth pool when the expected duration of the connection is at least one of equal and exceed the predetermined time; and
    routing the connection on the short lived bandwidth pool when the expected duration of the connection is does not exceed the predetermined time.

20. The system of claim 18, wherein determining whether to route the connection on one of the long lived bandwidth pool and short lived bandwidth pool includes determining whether routing the connection on one of the long lived bandwidth pool and the short lived bandwidth pool will cause defragmentation of the one of the long lived bandwidth pool and the short lived bandwidth pool; and
    routing further includes routing the connection on the short lived bandwidth pool when it is determined that the connection will cause defragmentation.

* * * * *